US008769659B2

(12) United States Patent
Boyle et al.

(10) Patent No.: US 8,769,659 B2
(45) Date of Patent: *Jul. 1, 2014

(54) NULL-PACKET TRANSMISSION FROM INSIDE A FIREWALL TO OPEN A COMMUNICATION WINDOW FOR AN OUTSIDE TRANSMITTER

(75) Inventors: Steven C. Boyle, Santa Barbara, CA (US); Debra C. Kirchhoff, Santa Barbara, CA (US)

(73) Assignee: Google Inc., Mountain View, CA (US)

( * ) Notice: Subject to any disclaimer, the term of this patent is extended or adjusted under 35 U.S.C. 154(b) by 354 days.

This patent is subject to a terminal disclaimer.

(21) Appl. No.: 13/218,324

(22) Filed: Aug. 25, 2011

(65) Prior Publication Data

US 2011/0314535 A1    Dec. 22, 2011

Related U.S. Application Data

(63) Continuation of application No. 11/159,505, filed on Jun. 22, 2005, now Pat. No. 8,079,072, which is a continuation of application No. 09/682,084, filed on Jul. 18, 2001, now Pat. No. 6,978,383.

(51) Int. Cl.
*G06F 9/00* (2006.01)
*H04L 29/06* (2006.01)

(52) U.S. Cl.
CPC .................. *H04L 63/029* (2013.01)
USPC .......................................... 726/11

(58) Field of Classification Search
USPC .............. 726/11–14; 709/223, 225, 230, 277; 713/150, 153, 154
See application file for complete search history.

(56) References Cited

U.S. PATENT DOCUMENTS

| 6,104,716 | A  | * | 8/2000  | Crichton et al. ............... 370/401 |
| 6,219,706 | B1 | * | 4/2001  | Fan et al. ........................ 709/225 |
| 6,674,713 | B1 | * | 1/2004  | Berg et al. ...................... 370/217 |
| 7,254,832 | B1 | * | 8/2007  | Christie, IV .................... 726/11 |
| 8,079,072 | B2 | * | 12/2011 | Boyle et al. ..................... 726/11 |
| 2002/0101860 | A1 | * | 8/2002 | Thornton et al. ............. 370/352 |
| 2003/0165136 | A1 | * | 9/2003 | Cornelius et al. ............. 370/356 |
| 2004/0047358 | A1 | * | 3/2004 | Chen et al. ..................... 370/401 |

* cited by examiner

*Primary Examiner* — Beemnet Dada
(74) *Attorney, Agent, or Firm* — Birch, Stewart, Kolasch & Birch, LLP (57) ABSTRACT

A high-bandwidth direct communication path between two clients is used for voice or video calls over the Internet. An opening or a window in a firewall is made for the direct path by sending a null packet out from inside the firewall. The null packet can be a UDP packet directed to a UDP port of the other client. Initially, each client makes a TCP connection to port 80 of an external manager. Each client registers its UDP port number with the external manager. A call request from one client to the external manager results in a message from the external manager to the other client. The other client then creates the window in its firewall by transmitting the null UDP packet. Then the external manager is notified and tells the calling client to begin sending UDP packets directly to the other client through the firewall window.

18 Claims, 7 Drawing Sheets

PRIOR ART

FIG. 1

PRIOR ART

NULL-PACKET TRANSMISSION FROM INSIDE A FIREWALL TO OPEN A COMMUNICATION WINDOW FOR AN OUTSIDE TRANSMITTER

CROSS REFERENCE TO RELATED APPLICATIONS

This application is a Continuation of application Ser. No. 11/159,505 filed on Jun. 22, 2005, now U.S. Pat. No. 8,079,072 which is a continuation of application Ser. No. 09/682,084 filed on Jul. 18, 2001 now U.S. Pat. No. 6,978,383. This application claims priority to the above-identified applications, the entire contents of which are hereby incorporated by reference.

FEDERALLY SPONSORED RESEARCH

Not Applicable

SEQUENCE LISTING

Not Applicable

BACKGROUND OF THE INVENTION

This invention relates to computer network communication software, and more particularly to opening communications windows in firewalls.

The Internet enables communication among distant computers and local networks. Electronic mail, web browsing, instant messaging, and video and audio streaming are common today. Using the Internet to complete telephone calls is possible using voice-over-Internet-Protocol (VoIP) technology. Video messages may also be exchanged using enhancements to VoIP technology.

To protect local computers and networks from unauthorized use or even outright attack, various security measures can be taken. A barrier between a local network and the Internet is often employed. This barrier is known as a firewall since it protects internal networks from the ravages of the open Internet.

"Firewall" is a generic term that describes an array of different technologies for securing computer networks. Some common Firewall technologies are Packet Filters, Proxy Servers, Network Address Translation, Port Address Translation and Application Protocol Filtering. Firewalls can be implemented in routers, special firewall appliances, and bastion hosts at the connection point of two or more computer networks. Personal firewalls are a software application running on a personal computer.

Figure 1:
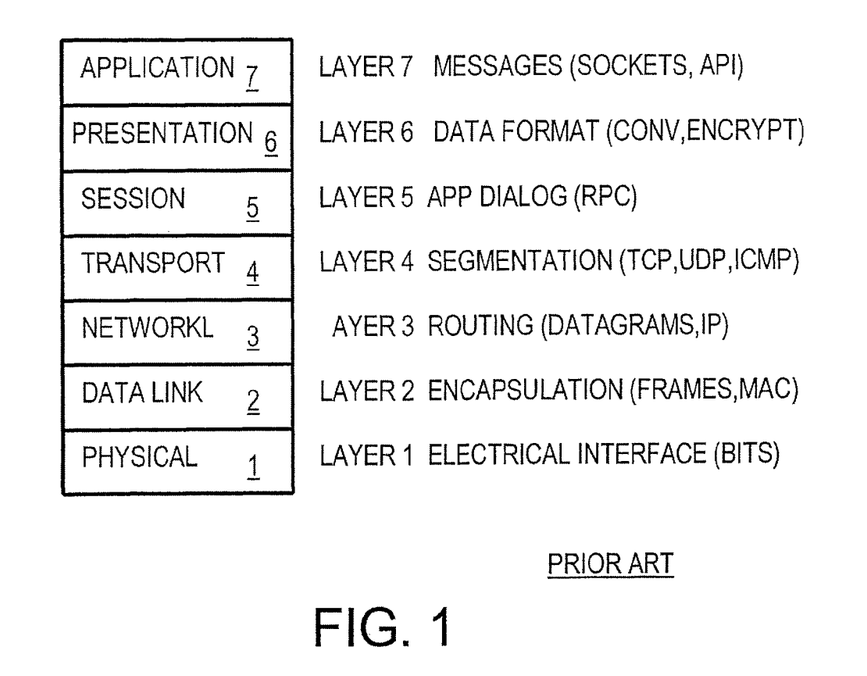
FIG. 1 is a reference diagram for the Open Systems Interconnection (OSI) network model.

Firewalls can operate on different levels of the network. FIG. 1 is a reference diagram for the Open Systems Interconnection (OSI) network model. Packets passing through a firewall can be filtered by examining their IP addresses, TCP ports, protocols, states, or other header criteria at network layer 3 or transport layer 4.

Dynamic or stateful packet filters can operate on most of the layers. Only specifically-configured traffic is allowed through the firewall, such as web-browser traffic that uses Transport-Control-Protocol (TCP) on port 80. All traffic from outside the firewall can be blocked except when a connection is opened from within the firewall. A temporary return path, opening, or window is created through the firewall for each connection initiated from the local network within the firewall. This window closes when the connection is closed.

For User Datagram Protocol (UDP), the temporary return path is closed when no traffic has flowed through the Dynamic Packet Filter for a configurable time period. Some firewalls allow traffic flowing in either direction to reset the timer, while others allow only outbound packets to reset the timer.

Proxy servers can operate on layers 3, 4, or application layer 7. Clients behind the firewall connect to the proxy server, which then makes another connection to the final server. Application protocol filtering can also operate on layer 7. Presentation layer 6, and session layer 5 are between the sockets of layer 7 and the TCP connections of layer 4. Data link layer 2 encapsulates the data into the actual packets or frames transmitted over the physical layer 1.

Figure 2:
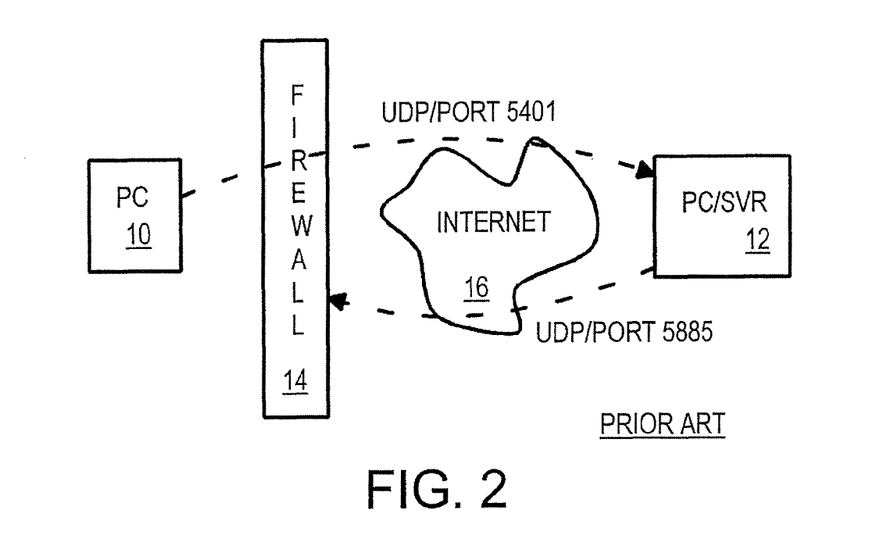
FIG. 2 illustrates how a firewall can block UDP packets for a VoIP application.

Firewalls can interfere with some Internet applications, even preventing their use across firewalls. For example, VoIP applications can be blocked by firewalls. FIG. 2 illustrates how a firewall can block UDP packets for a VoIP application. Personal computer PC 10 is protected by firewall 14, while server or PC 12 is directly connected to Internet 16.

Voice call applications prefer to use UDP rather than TCP to stream audio using less bandwidth. Separate ports can be used for each direction of the audio stream. For example, audio from the user at PC 10 can be sent over Internet 16 to port 5401 of PC 12 using the UDP protocol. Datagrams can pass through firewall 14 since they originate from within (inside) firewall 14.

The reverse-direction audio stream is sent from PC 12 to a different port 5885 of PC 10. However, when PC 12 attempts to stream audio back to PC 10, firewall 14 blocks the UDP datagrams. Firewall 14 sees these UDP datagrams as coming from Internet 16 without a request from within PC 10 the firewall. Firewall 14 blocks these UDP datagrams, assuming that they are unauthorized and possibly an attack on the local network.

While some firewalls such as personal firewalls can be configured to allow the incoming packets to enter from the outside Internet, most firewalls cannot be configured by ordinary users. While some standard-application traffic may be able to pass through firewalls, such as web traffic using TCP to port 80, other kinds of traffic such as UDP packets and for other arbitrary ports is often unconditionally blocked.

What is desired is a method for opening a window in a firewall to allow entry of audio or video streams originating from outside the firewall. A program that can open a firewall window is desired. Opening of firewalls for UDP datagrams or packets is especially desired to allow VoIP to operate across firewalls.

BRIEF SUMMARY OF THE INVENTION

The invention is a computer product and a method for managing communication between users over a network when at least one user is connected to a network through a firewall. The product includes applications running on the users' devices and an external manager application. The invention includes a provision for communication between the external manager and users over a channel which can pass through a firewall. User applications provide registration information, including communication channel information, to the external manager application at a time before communication between users is initiated. One user application requests communication with another user application by communicating the request to the external manager application. The external manager application provides the user applications with instructions to initiate and accept communications through a firewall on the communications channels registered with the external manager application, such that the user applications use the instructions to establish communications with one another through a firewall.

In one aspect of the invention the network is the Internet. In one version, the communication channel information includes IP address and port data.

In a preferred embodiment, the communication channel between the users and the external manager is TCP/IP protocol on a port accepted by a firewall, and the communication channel between the users is UDP. In a version of this embodiment, the type of communication between the users is VoIP.

BRIEF DESCRIPTION OF THE DRAWINGS

The invention will be better understood by referring to the following figures.

DETAILED DESCRIPTION OF THE INVENTION

The present invention relates to an improvement in voice-over-Internet Protocol (VoIP) through firewalls. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 3:
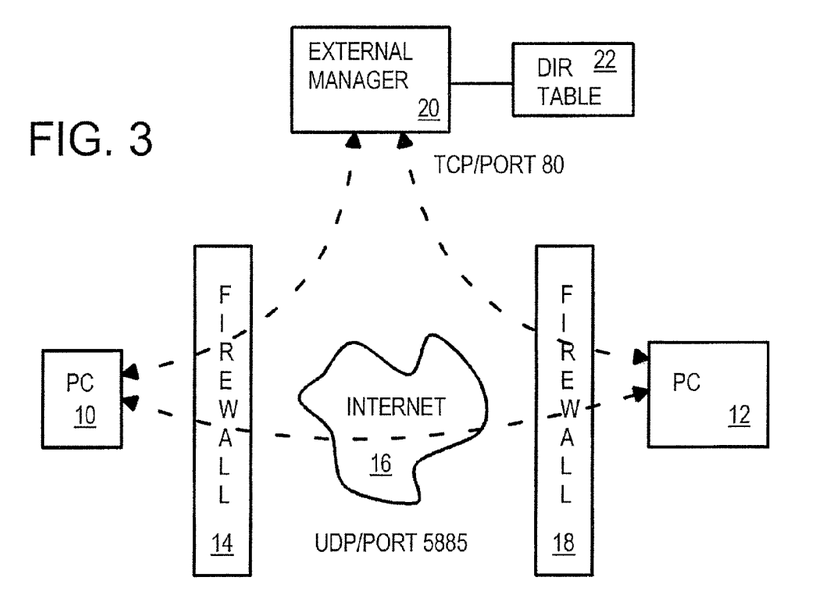
FIG. 3 shows an external manager for setting up a communication channel through firewalls.

FIG. 3 shows an external manager for setting up a communication channel through firewalls. PC 10 is on a local network protected by firewall 14, while server or PC 12 is on a local network protected by firewall 18. Firewalls 14, 18 filter packets, translate addresses, act as proxy servers, or otherwise provide protection from Internet 16.

External manager 20 is on a server accessible from Internet 16. External manager 20 can be accessed through a web site that PC 10 and PC 12 each connect to. Since web browsers use the Transport-Control-Protocol (TCP) and port 80, firewalls 14, 18 are configured by default to allow incoming TCP packets to and from port 80, although perhaps only when PC 10 or PC 12 first send a packet out to external manager 20 and thus initiate a TCP connection from within the firewall.

A communication program such as VoIP prefers to make a direct connection using UDP between PC 10 and PC 12. This reduces latency and thus optimizes voice quality. However, firewalls 14, 18 do not allow UDP connections to be initiated from outside the firewall. Since TCP connections to external manager 20 are allowed, PC 10 and PC 12 first connect to external manager 20. External manager 20 registers each PC by storing addresses and ports for the PCs in directory table 22. Keep-alive messages are used to maintain the TCP connection.

When PC 10 attempts to initiate a call to PC 12, PC 10 uses TCP port 80 to send the call request to external manager 20. External manager 20 then searches for the address and port information for PC 12 in directory table 22. This information is used to send a message from external manager 20 to PC 12.

PC 12 can open a connection when registering and then periodically send a keep-alive packet to external manager 20 to maintain the connection.

Once PC 12 receives the message from external manager 20, it opens a window in firewall 18. External manager 20 then notifies PC 10 that it can now use this window to send UDP packets back to PC 12. The message from external manager 20 specified the port to use for the window, which is UDP port 5885 in this example. Since PC 12 sends out a UDP packet over port 5885 from within firewall 18, firewall 18 creates an entry in its filter tables to allow UDP packets to pass through port 5885 to PC 12 from Internet 16. The address of PC 12 can also be also checked for incoming packets by firewall 18.

A window in firewall 14 is opened when PC 10 sends the first UDP packets to PC 12. Thus windows are opened in both firewalls 14, 18. External manager 20 acts as a third party message-passing service, telling both PC's 10, 12 which UDP port to use.

Figure 4:
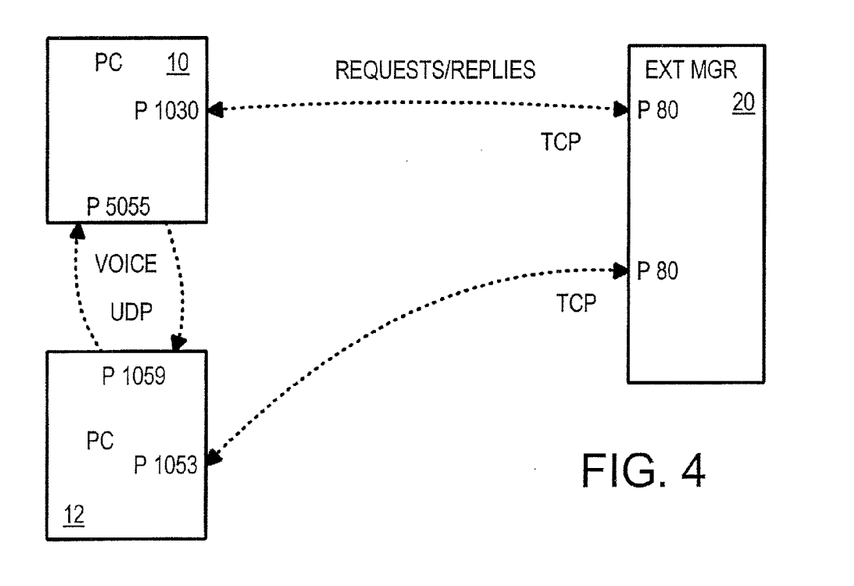
FIG. 4 is a diagram highlighting port connections using an external communication manager but direct voice connections.

FIG. 4 is a diagram highlighting port connections using an external communication manager but direct voice connections. PC 10 and PC 12 each register with external manager 20 by opening TCP connections to port 80 of external manager 20. This allows packets from external manager 20 to pass through any intervening firewalls. PC 10 and PC 12 can use a different port for making the connection, such as port 1030 and port 1053, or any port above 1023, as long as the external port is port 80 or port 443. Packets from external manager 20 can include call requests from other PC's.

When requested by external manager 20, PC 10 and PC 12 open windows in their firewalls for a port specified by external manager 20. In this example, UDP port 5055 is used on PC 10, while UDP port 1059 is used by PC 12. PC 12 is instructed by external manager 20 to send a UDP packet from its port 1059 to port 5055 on PC 10. This opens a window in firewall 18 for incoming packets to UDP port 1059 from an external port 5055.

UDP packets are streamed between PC 10 port 5055 and PC 12 port 1059 through the firewall openings. Since UDP is more efficient at transferring voice data than TCP, a higher bandwidth is available for the call. UDP is more efficient than TCP because there is no 3-way handshake to establish a TCP connection (in fact there is no formal "connection"), no check for losses, no re-transmission, and a lower packet-header overhead. A direct connection is made for the voice traffic, even though external manager 20 is used to initiate the call.

Figure 5:
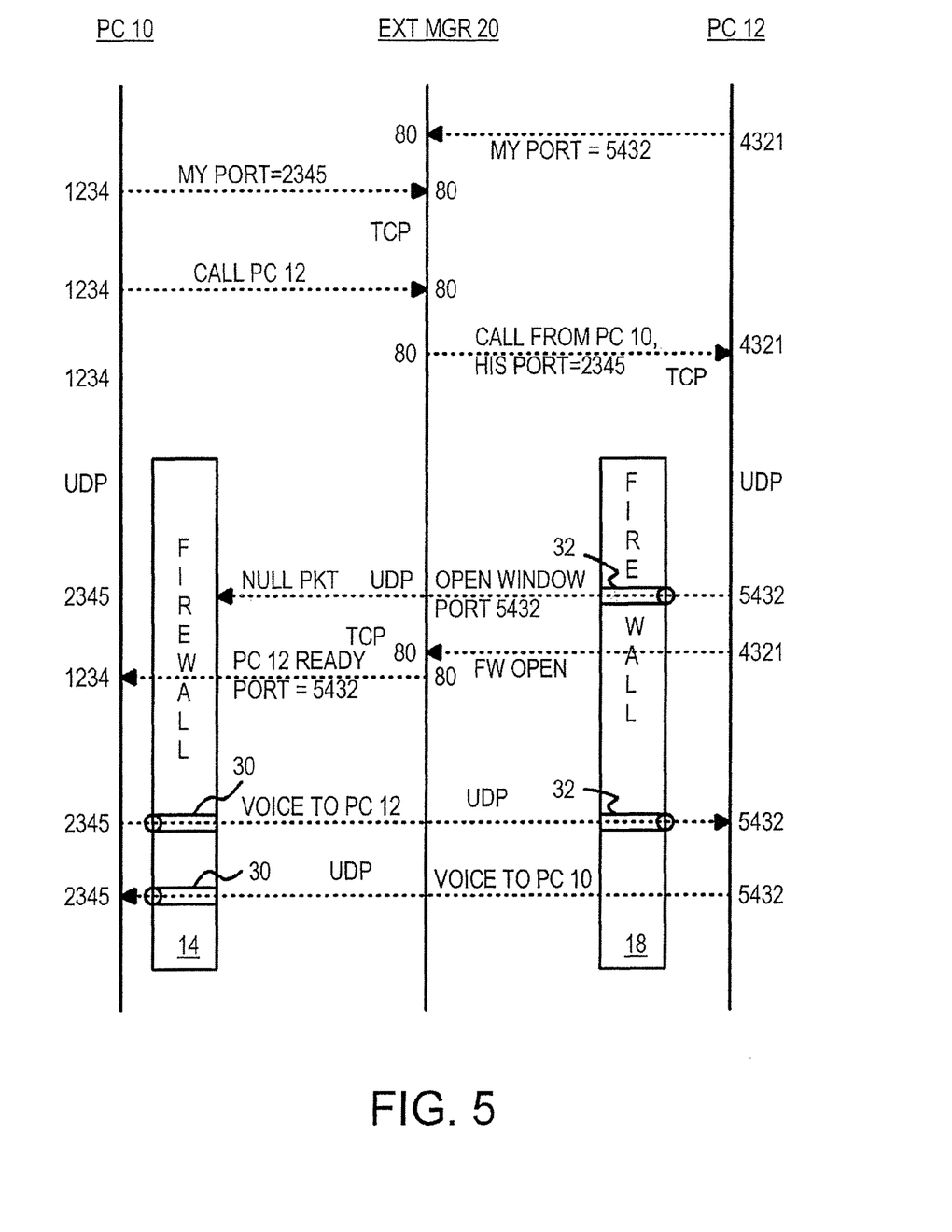
FIG. 5 is a diagram showing messages sent and connections made among the PC's and the external manager.

FIG. 5 is a diagram showing messages sent and connections made among the PC's and the external manager. External manager 20 receives registration requests from various locations on the Internet, including PC 10 and PC 12. PC 12 opens a TCP connection to port 80 of external manager 20. The local UDP port that PC 12 uses for direct communication with another PC is sent to external manager 20. In this example, the local UDP port is 5432.

Likewise, PC 10 registers with external manager 20 by opening a TCP connection to port 80, and sending its local UDP port, 2345. The UDP ports can be arbitrary ports and are sent along with other configuration information. Using arbitrary UDP ports allows for greater configuration flexibility and avoidance of conflicts with other programs running on a PC that may use UDP ports.

Since a TCP connection to port 80 is made to external manager 20, these request packets can pass through any local firewalls that protect PC 10 or PC 12. As long as the PC's can browse the web, which uses TCP/80, the PC's can access external manager 20. Reply packets from external manager 20 can also pass through the firewalls through windows that are automatically set up by the firewall when the PC first connects with external manager 20. For the most restrictive firewalls, PCs 10, 12 could use port 80, but many firewalls allow other arbitrary TCP ports to be used, such as TCP port 1234 for PC 10 and TCP port 4321 for PC 12.

When the user at PC 10 wishes to communicate with the user at PC 12, a call-setup request is sent to external manager 20. The same TCP ports are used, in the same connection as the registration. In this example the call request is contained in packet or packets that are sent to TCP port 80 from port 1234 of PC 10. The call request from PC 10 identifies PC 12 as the called party.

External manager 20 searches its directory table for more information on the called party, PC 12, and finds its IP address and TCP port (4321). External manager 20 sends a call notification request to this port of PC 12 using a TCP connection. This call notification includes the UDP port of the calling party (port 2345), as well as its IP address. The request may include other information or commands, such as a command to open a window in its firewall 18.

PC 12 may need to periodically open a new TCP connection to external manager 20 to allow the request from external manager 20 to pass through its firewall 18. For example, PC 12 can send a TCP packet every minute to external manager 20. Less restrictive firewalls may not require the periodic packet transmission from inside firewall 18.

A window in firewall 18 must be opened to allow incoming UDP packets from PC 10 to pass through firewall 18 to PC 12. A null UDP packet is transmitted from PC 12 to PC 10 to open window 32 in firewall 18. The null packet is sent from UDP port 5432 of PC 12 to UDP port 2345 of PC 10. Since the packet originates from within firewall 18, it is allowed to pass through firewall 18 to the Internet.

Firewall 18 typically stores the IP addresses and UDP ports of PC 10 and PC 12, and the protocol used (UDP) in a table. This table is consulted when an incoming packet is received from the Internet. When the incoming packet's protocol, source and destination IP addresses and ports match an entry in the table, the packet is allowed to pass through the firewall. Otherwise, the packet is rejected and prevented from entering the local network. Thus an opening or window through the firewall is created when a table entry is stored. The table entry allows for a reply from the external Internet to the outgoing packet.

Other kinds of firewalls may store other information, such as the originating application on PC 12, a data-link, media-access-controller, or Ethernet address. This alternate information can be used for matching packets or communications at different OSI levels from outside the firewall.

The null UDP packet from PC 12 thus creates an entry in the table of firewall 18. This entry creates window 32, allowing UDP packets to be transferred back and forth directly between PC 10 and PC 12.

The UDP packet from PC 12 is prevented from reaching PC since it is blocked by firewall 14 as an un-requested UDP packet from the outside Internet. Since the UDP packet is discarded by the other firewall 14, it does not contain any important information. Ideally, a null packet is used that contains no data. This minimizes the packet size and reduces bandwidth waste. Of course, if firewall 14 is permissive or absent, the null packet can reach PC 10. Then PC 10 simply discards the null packet.

Once the null packet has been sent by PC 12 through firewall 18, PC 12 notifies external manager 20 that window 32 has been created. This firewall-open reply is sent to TCP port 80 of external manager 20 from TCP port 4321 of PC 12. TCP port 80 traffic can easily pass through firewall 18 since it appears to be web-browser traffic. The HTTP protocol may be used for the entire connection, to satisfy restrictive application-level firewalls.

External manager 20 sends a reply to PC 10, indicating that PC 12 is now ready to stream UDP packets. The reply can contain the UDP port that PC 12 uses, port 5432. This reply is sent from TCP port 80 of external manager 20 to TCP port 1234 of PC 10, and can pass through firewall 14, as it appears to be standard web traffic.

PC 10 can now initiate a direct connection with PC 12 using high-bandwidth UDP packets. Such a direct UDP connection is ideal for multi-media data such as audio, voice, video, and binary data formats.

PC 10 sends its first UDP packet from its port 2345 to port 5432 of PC 12. Since this UDP packet originates from the local network within firewall 14, firewall 14 opens window 30, such as by creating a table entry that includes ports 2345 and 5432, and the address of PC 12.

This first UDP packet passes through window 30 of firewall 14 to the Internet, where it is routed to firewall 18. Since the packet's ports and addresses match the table entry for window 32, firewall 18 allows the UDP packet to pass through window 32 to the local network, where it is routed to PC 12. Thus window 32 opened by the null packet from PC 12 is already set up before incoming packets arrive from PC 10.

Additional UDP packets can be sent from PC 10 to PC 12 over this path. Windows 30, 32 remain open for some time. Timers may close windows 30, 32 after some period of time with no packet flow, or no outgoing packets from inside the firewall. However, for most active 2-way communications, packets occur with a frequency sufficient to maintain windows 30, 32.

PC 12 also sends UDP packets along this path, using window 30 in firewall 14 to reach PC 10 from outside firewall 14. Since these packets originate from inside firewall 18, they are allowed to pass through, and keep window 32 open by resetting the packet timer. A field in the firewall table entry can be used to store the timer value.

Figure 6:
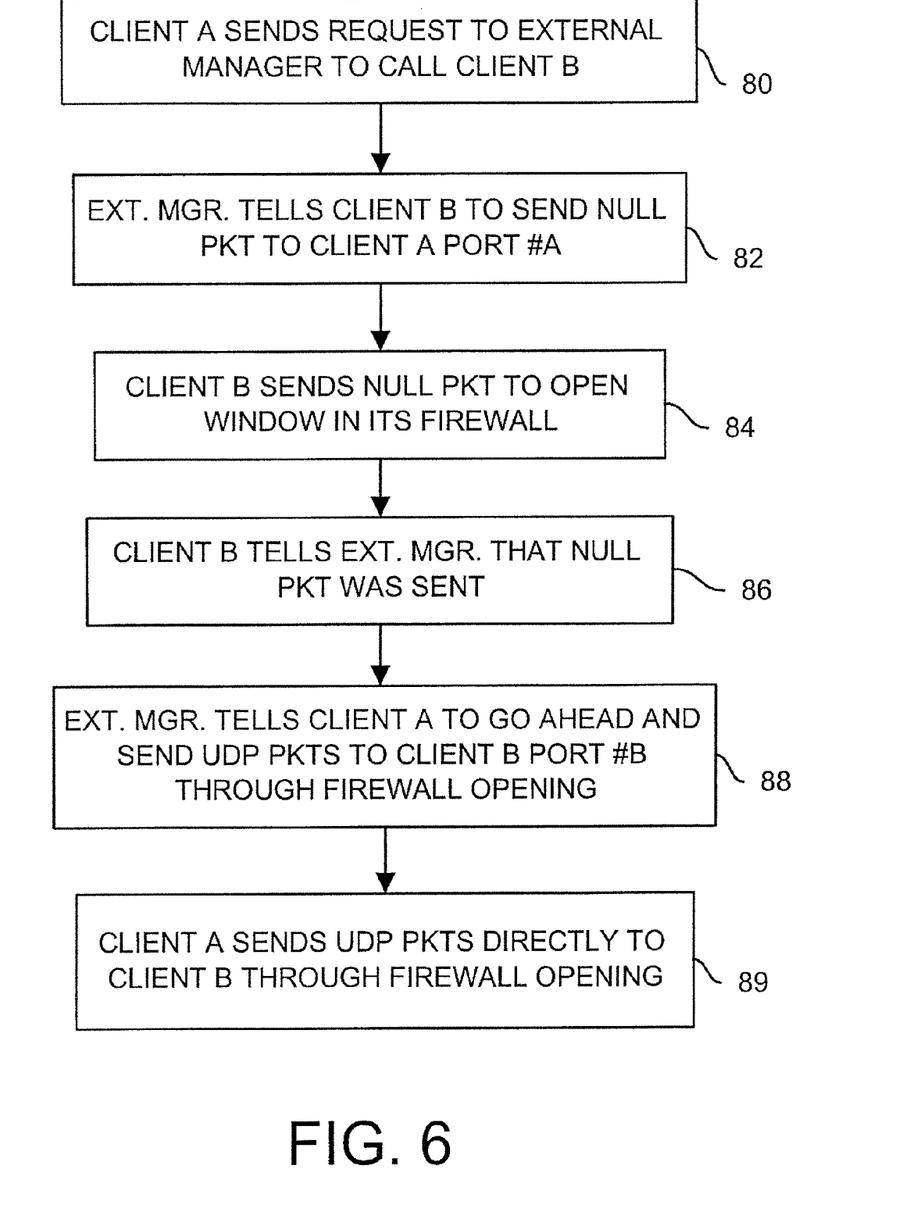
FIG. 6 is a flowchart of call setup, firewall-window opening, and direct packet transfer for a firewall-friendly communication program.

FIG. 6 is a flowchart of call setup, firewall-window opening, and direct packet transfer for a firewall-friendly communication program. PC's or clients register with an external manager, providing communication ports to use. When client A desires to make a call to client B, a request is sent to the external manager by client A, step 80.

The external manager sends a command to client B that tells client B to transmit a null packet to open a window in his firewall, step 82. The destination port of the null packet is port #A of client A, which was provided by client A during registration. Client B then transmits a null packet to client A, step

84. The firewall stores an entry for the outgoing packet, causing a communication window to be opened for replies from client A.

Client B sends a message to the external manager, confirming that the null packet has been sent, step 86, The firewall window should now be open, ready to receive incoming packets from client A.

The external manager sends a message to client A, step 88, telling client A that the firewall should now be open. Client A can now go ahead and start direct communication with client B through the firewall opening. As client A begins this direct communication, step 89, an opening is created in any firewall protecting client A. Preferably, UDP packets are used for the direct communication, although other protocols could be used. Enhancements and extensions to UDP and derivatives of it may also be used, as may similar high-speed protocols.

Figure 7:
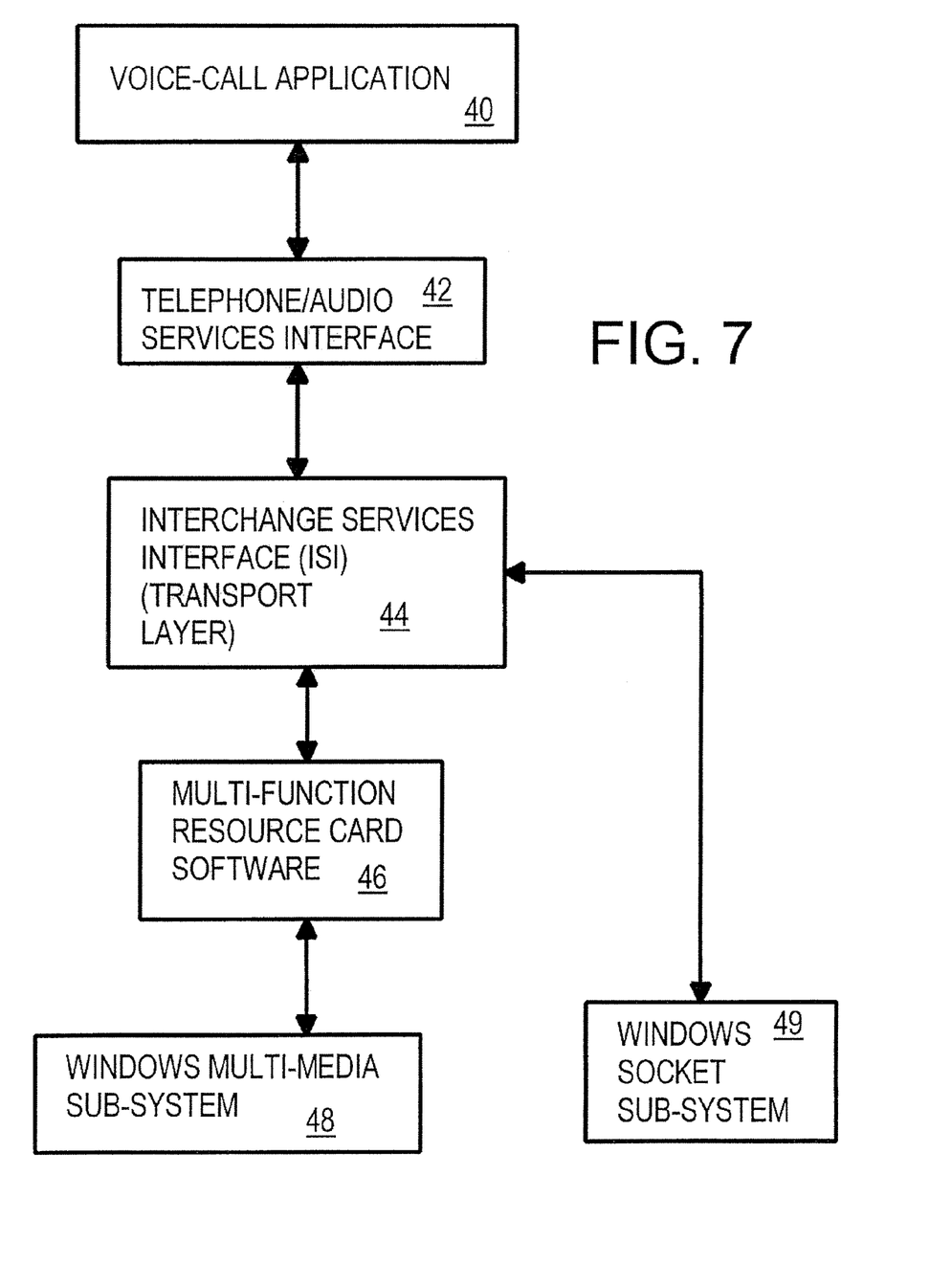
FIG. 7 is a block diagram of software and hardware components in a direct communication system on a client computer.

FIG. 7 is a block diagram of software and hardware components in a direct communication system on a client computer. Voice-call application 40 is a high-level application that can be operated by a user of the client PC. The user can initiate and terminate voice or audio/video calls over the Internet using a user interface to application 40.

Telephony/Audio Services Interface (TASI) 42 is a development environment that provides an application programming interface (API) for using library features or functions called by application 40. TASI 42 can have a variety of services such as call control (detecting, placing, and terminating calls between clients) and audio stream control and formatting.

Interchange services 44 corresponds to the OSI-model transport layer. Interchange services 44 provides packet transport using IP packets. Communication sockets in Windows socket sub-system 49 can be opened by Interchange services 44 to send and receive IP packets containing audio or video data to a remote client over the Internet. Of course, socket sub-systems other than Windows can be substituted.

Multi-function resource 46 can be implemented in hardware or software or both. Multi-function resource 46 provides a host-based software layer that performs a variety of functions. Multi-function resource 46 can perform digital-signal processor (DSP) functions, such as voice compression, echo cancellation, bad frame interpolation for late or lost packets, silence compression, voice activity detection, and comfort noise generation. In addition, multi-function resource 46 provides the ability for playing wave files on multimedia subsystem 48. Multi-function resource 46 has three main subsystems: the voice compression subsystem, the packetization subsystem, and the voice quality subsystem.

Windows multimedia subsystem 48 contains the operating system drivers and low-level components that communicate with the hardware, such as a sound card or audio subsystem. Speakers and a microphone, or other multi-media devices can be connected to the hardware controlled by multimedia subsystem 48.

Figure 8:
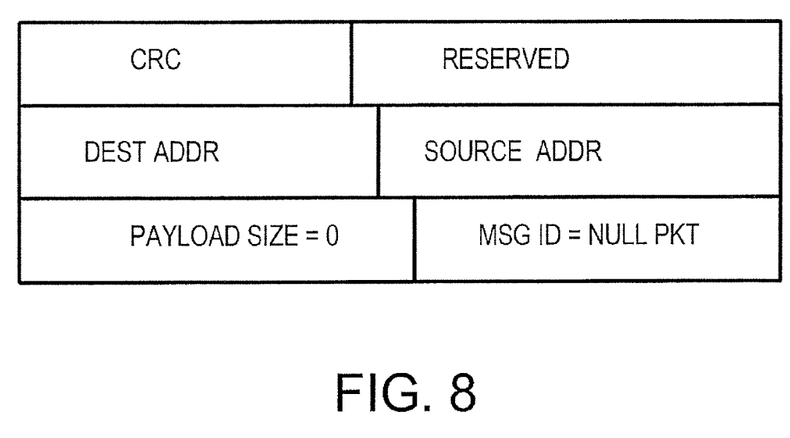
FIG. 8 is a header for a null packet that opens a communications window in a firewall.

FIG. 8 is a header for a null packet that opens a communications window in a firewall. This header can be sent from Interchange services 44 to Windows socket sub-system 49 to cause the null packet to be generated and transmitted from the local client PC.

The header has a cyclical-redundancy-check (CRC) field for error detection, and a reserved field. The destination or end-point identifier of the communication call connection of the other PC and the identifier of the sending PC are included. These are internal identifiers of the software that is handling the source or destination side of the call.

For null packets, the payload size is set to zero, since there is no data. The message ID field is set to indicate that the packet is a null packet.

Figure 9:
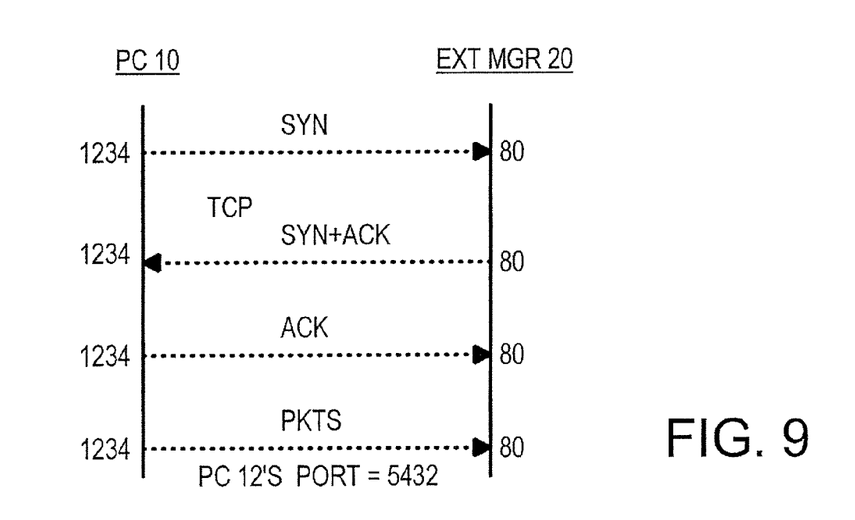
FIG. 9 shows a TCP connection between a client PC and the external manager.

FIG. 9 shows a TCP connection between a client PC and the external manager. The connection begins with a SYN packet sent from PC 10 to port 80 of the external manager. The external manager responds with a SYN+ACK packet back to the sending port of the client (port 1234 in this example). The client PC 10 then finishes the handshake with an ACK packet back to external manager 20. The client PC 10 can then send data packets, such as one containing the client's UDP port number in the data payload. SYN and ACK are flags that can be set in the TCP packet header, such as described in the commonly-used RFC 793 standard.

When a connection is closed by a FIN packet, or times out, a new SYN-ACK sequence is needed to open a new TCP connection. UDP packets are connection-less and do not require the SYN-ACK handshake. UDP is an alternative to TCP. UDP also uses IP to send a datagram over a network, and is sometimes referred to as UDP/IP. UDP does not provide sequencing of the packets. The application program using UDP must be able to sequence datagrams and verify the integrity of the datagrams as they are received. Network applications can save processing time with UDP since very small data units can be exchanged, with little message re-assembly required.

UDP provides two services not provided by the IP layer. It provides a port number to help distinguish different user requests and, optionally, checksum capability to verify that the data arrived intact.

Figure 10:
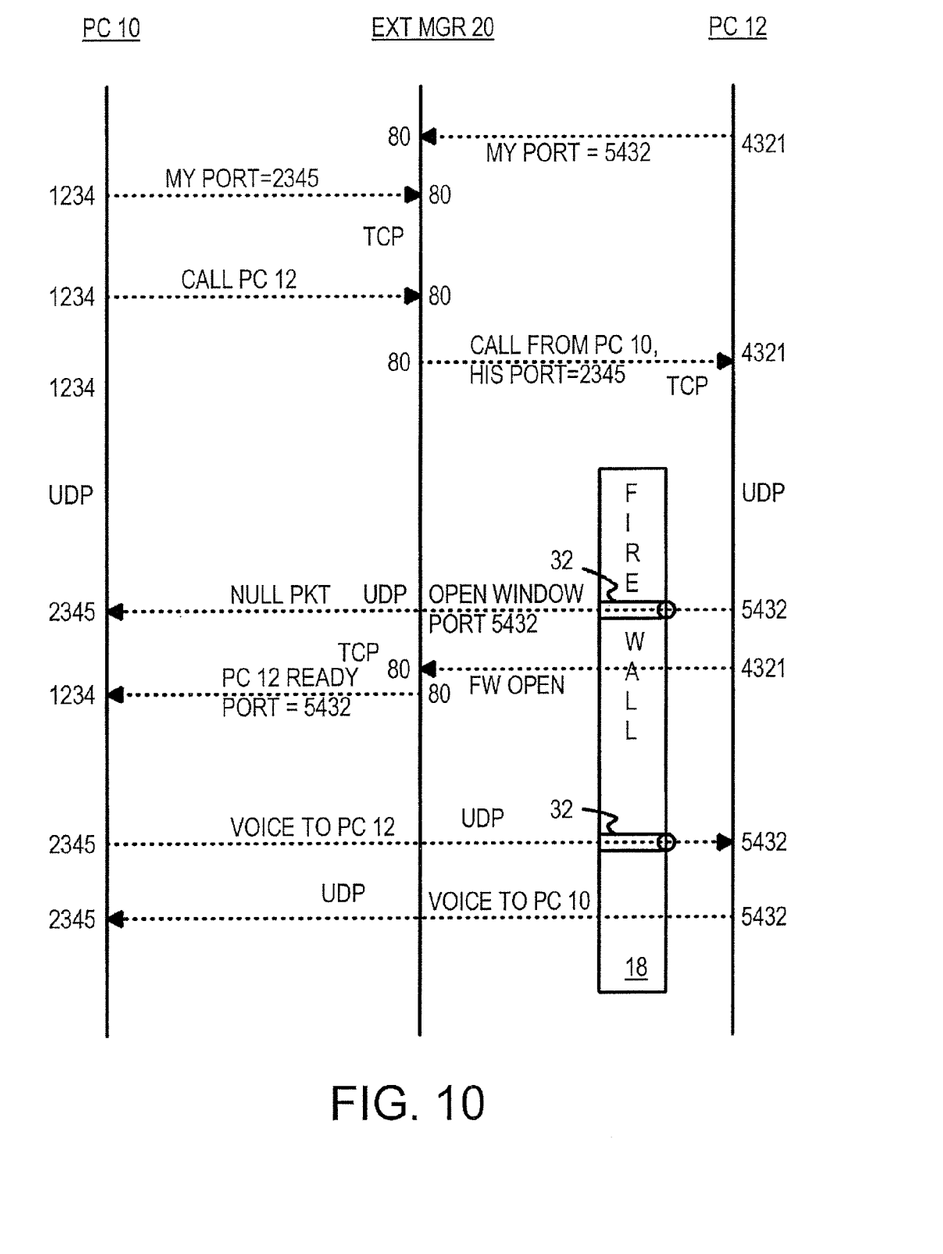
FIG. 10 is a message-passing diagram in which only one client has a protective firewall that must be opened with a null packet.

FIG. 10 is a message-passing diagram in which only one client has a protective firewall that must be opened with a null packet. PC 10 does not have a firewall, or has a very permissive firewall that allows UDP packets to be received from any outside location. PC 12 has a restrictive firewall 18.

PC 10 registers with external manager 20 by sending its UDP port 2345 in a TCP connection to port 80 of external manager 20. Likewise, PC 12 registers its UDP port 5432.

Some time later, PC 10 attempts to call PC 12 by sending a message to port 80 of external manager 20. External manager 20 sends a message to PC 12 with the IP address and UDP port to send the null packet to, port 2345 of PC 10.

PC 12 generates a null UDP packet and transmits it to port 2345 of PC 10. Firewall 18 stores the addresses and UDP ports, creating window 32 for future use. Since there is no firewall protecting PC 10, the null packet is received by PC 10. The null packet contains no data, so it is ignored or discarded by PC 10.

PC 12 then messages to port 80 of external manager 20 that it has sent the null packet to open the firewall. External manager 20 sends a message to PC 10 that communication can now be established with PC 12. The UDP port of PC 12 (port 5432) is also sent to PC 10.

PC 10 can then begin sending UDP packets from its port 2345 to port 5432 of PC 12. Firewall 18 allows these packets to pass through to PC 12 since window 32 has already been opened. UDP packets can be sent in the reverse direction from PC 12 to PC 10 using the same pair of UDP ports. Thus 2-way voice or video communication is facilitated by a direct full-duplex UDP link between PCs 10, 12.

Several other embodiments are contemplated by the inventors. For example other ports and protocols may be used. Separate port-pairs may be used for each direction of packet flow, and more than 2 client endpoints may share a packet stream. Multicasting may also be employed. Additional windows may be opened in the firewall to allow for multiple calls to different PC's. The order of the various steps may be changed, and additional steps can be included. The external manager can operate on a variety of ports, such as ports 80 and 443. Rather than periodically send keep-alive messages, PC 12 could periodically open a connection to external manager 20, such as once every minute. A new connection could be made if some time has passed since registration. A list of several alternate UDP ports can be sent rather than a single port.

The client or PC may be a portable computing device such as a personal-digital-assistant (PDA), palm computer, enhanced cell phone, Internet appliance, or other computing device rather than just a standard desktop or laptop PC. Operating systems other than Windows, such as Linux, Unix, and MacOS may be used for the PC. The external manager can reside on a server that runs many applications including web server applications. Software routines may be stored on disks or other media, or may be programmed as firmware or programmable logic or even converted to partial or full hardware implementations.

The invention has been described in an embodiment of two clients directly communicating with one another, such as for making VoIP calls, whether audio-only or with video. The invention can also be applied to other peer-to-peer communications, such as for file-sharing systems. One of the two clients may act as a server rather than a peer or client.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. §1.72(b). Any advantages and benefits described may not apply to all embodiments of the invention. When the word "means" is recited in a claim element, Applicant intends for the claim element to fall under 35 USC §112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC §112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A method for managing communication over a data communication network, the method comprising:
   providing an external communication manager on the data communication network outside of a first firewall;
   first registering, at the external communication manager, first communication channel information about a first communication application by registering first IP address data associated with the first communication application and firewall window data for the first firewall, said first communication application being separated from the data communication network by the first firewall;
   second registering, at the external communication manager, second communication channel information about a second communication application by registering second IP address data associated with the second communication application, said second communication application being blocked from directly communicating with the first communication application by the first firewall;
   receiving, at the external communication manager, a request for communication between the first communication application and the second communication application after said first and second registering steps; and
   instructing, from the external communication manager, the first and second communication applications to initiate and accept direct communications with each-other through the firewall based on the first and second registered communication channel information after said receiving step by instructing the first communication application to transmit, as an opening packet, a null packet from a port associated with the firewall window at the first IP address to a port associated with the second communication application at the second IP address.

2. The method of claim 1, where said direct communications between the first and second communication applications through the firewall is by TCP/IP protocol.

3. The method of claim 1, wherein the direct communications between the first and second communication applications is by VoIP.

4. The method of claim 1, wherein the direct communications between the first and second communication originators is by UDP protocol.

5. The method of claim 1, the second communication application being separated from the data communication network by a second firewall.

6. The method of claim 5 said first communication application being blocked from directly communicating with the second communication application by the second firewall.

7. The method of claim 5, said registering including registering second firewall window data for said second firewall, and
   said instructing including instructing the second communication application to transmit an opening packet from a port associated with the second firewall window at the second IP address to a port associated with the first firewall window at the first IP address.

8. The method of claim 1, said port associated with the firewall window and said port associated with the second communication application both being the same type of port.

9. The method of claim 1, said firewall window data including an identified UDP port.

10. A non-transitory computer-usable medium having a program embodied thereon which, when executed by one or more processors, causes said processors to carry out a method for managing communication over a data communication network, the method comprising:
    providing an external communication manager on the data communication network outside of a first firewall;
    first registering, at the external communication manager, first communication channel information about a first communication application by registering first IP address data associated with said first communication application and firewall window data for said first firewall, said first communication application being separated from the data communication network by the first firewall;

second registering, at the external communication manager, second communication channel information about a second communication application by registering second IP address data associated with the second communication application, said second communication application being blocked from directly communicating with the first communication application by the first firewall;

receiving, at the external communication manager, a request for communication between the first communication application and the second communication application after said first and second registering steps; and instructing, from the external communication manager, the first and second communication applications to initiate and accept direct communications with each-other through the firewall based on the first and second registered communication channel information after said receiving step by instructing the first communication application to transmit, as an opening packet, a null packet from a port associated with the firewall window at the first IP address to a port associated with the second communication application at the second IP address.

11. The medium of claim 10, where said direct communications between the first and second communication applications through the firewall is by TCP/IP protocol.

12. The medium of claim 11, wherein the direct communications between the first and second communication applications is by VoIP.

13. The medium of claim 10, wherein direct communications between the first and second communication applications through the firewall is by UDP protocol.

14. A non-transitory computer-usable medium having a program embodied thereon which, when executed by one or more processors, causes said processors to carry out a method for managing communication over a data communication network, the method comprising:

providing an external communication manager on the data communication network outside of a first firewall;

first registering, at the external communication manager, first communication channel information about a first communication application by registering first IP address data associated with the first communication application and firewall window data for said first firewall, said first communication application being separated from the data communication network by the first firewall;

second registering, at the external communication manager, second communication channel information about a second communication application by registering second IP address data associated with the second communication application, said second communication application being blocked from directly communicating with the first communication application by the first firewall, and said second communication application being separated from the data communication network by a second firewall;

said second registering including registering second firewall window data for said second firewall, and receiving, at the external communication manager, a request for communication between the first communication application and the second communication application after said first and second registering steps; and instructing, from the external communication manager, the first and second communication applications to initiate and accept direct communications with each-other through the firewall based on the first and second registered communication channel information after said receiving step by instructing the second communication application to transmit as an opening packet, a null packet from a port associated with the second firewall window at the second IP address to a port associated with the first firewall window at the first IP address.

15. The medium of claim 14, said first communication application being blocked from directly communicating with the second communication application by the second firewall.

16. The medium of claim 10, said port associated with the firewall window and said port associated with the second communication application both being the same type of ports.

17. The medium of claim 10, said firewall window data including an identified UDP port.

18. An external communication manager apparatus for managing communication over a data communication network, the apparatus comprising:

a data communication portion that receives and transmits data from/to a data communication network;

a communication channel registration unit that registers first communication channel information about a first communication application, said first application being separated from the data communication network by a first firewall;

a registration storage table that stores registered communication channel information;

a direct communication request processing unit that receives a request for communication between the first communication application and a second communication application;

where the first communication application is associated with registered first communication channel information and the second communication application is associated with registered second communication channel information, and where said second application is blocked from directly communicating with the first application by the firewall; and an instruction generator that instructs the first and second communication application to initiate and accept direct communications with the first communication application through the firewall based on the first and second registered communication channel information in response to the request for communication;

where the external communication manager is located outside of the firewall; and where the instruction generator instructs the second communication application to transmit a null packet to the firewall to create a firewall window that permits direct communication between the first and second communication applications.

* * * * *